United States Patent
Schwab et al.

(10) Patent No.: US 10,790,563 B1
(45) Date of Patent: Sep. 29, 2020

(54) RECONFIGURABLE PHASE-SHIFTING NETWORKS

(71) Applicant: QUALCOMM Incorporated, San Diego, CA (US)

(72) Inventors: Martin Schwab, Munich (DE); Mikko Kaltiokallio, Espoo (FI)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/291,261

(22) Filed: Mar. 4, 2019

(51) Int. Cl.
| | |
|---|---|
| H03H 11/16 | (2006.01) |
| H03H 11/20 | (2006.01) |
| H03H 11/22 | (2006.01) |
| H01P 1/18 | (2006.01) |
| H01Q 3/30 | (2006.01) |
| H01Q 1/24 | (2006.01) |
| H04B 1/50 | (2006.01) |

(52) U.S. Cl.
CPC .............. *H01P 1/18* (2013.01); *H01Q 1/246* (2013.01); *H01Q 3/30* (2013.01); *H04B 1/50* (2013.01)

(58) Field of Classification Search
CPC ........ H03H 11/16; H03H 11/20; H03H 11/22; H01P 1/18
See application file for complete search history.

(56) References Cited

U.S. PATENT DOCUMENTS

| | | | | |
|---|---|---|---|---|
| 9,496,902 | B2 * | 11/2016 | Srirattana | H04B 1/40 |
| 2011/0199141 | A1 * | 8/2011 | Shin | H03H 11/20 327/252 |
| 2011/0304409 | A1 * | 12/2011 | Tamura | H03H 11/20 333/139 |
| 2013/0021111 | A1 * | 1/2013 | Grondahl | H01P 1/18 333/164 |
| 2017/0194688 | A1 * | 7/2017 | Sharma | H01P 5/16 |
| 2018/0205358 | A1 * | 7/2018 | Onaka | H04B 1/006 |
| 2020/0153412 | A1 * | 5/2020 | Nosaka | H03H 9/68 |

\* cited by examiner

*Primary Examiner* — Jinsong Hu
*Assistant Examiner* — Farideh Madani
(74) *Attorney, Agent, or Firm* — Patterson + Sheridan, LLP (57) ABSTRACT

Certain aspects are generally directed to an apparatus for wireless communication, implemented using a configurable phase shifter network. The configurable phase shifter network generally includes a first switch coupled to a common terminal of the phase shifter network, a first phase shifter coupled between a first terminal of the phase shifter network and the first switch, a second switch coupled in parallel with the first phase shifter, a third switch coupled to the common terminal, a fourth switch coupled to the first terminal, and a second phase shifter coupled between the fourth switch and the third switch.

18 Claims, 9 Drawing Sheets

RECONFIGURABLE PHASE-SHIFTING NETWORKS

TECHNICAL FIELD

Certain aspects of the present disclosure generally relate to electronic circuits and, more particularly, to radio-frequency front-end (RFFE) circuitry.

BACKGROUND

A wireless communication network may include a number of base stations that can support communication for a number of mobile stations. A mobile station (MS) may communicate with a base station (BS) via a downlink and an uplink. The downlink (or forward link) refers to the communication link from the base station to the mobile station, and the uplink (or reverse link) refers to the communication link from the mobile station to the base station. A base station may transmit data and control information on the downlink to a mobile station and/or may receive data and control information on the uplink from the mobile station. The base station and/or mobile station may include one or more phase shifters.

SUMMARY

Certain aspects are generally directed to an apparatus for wireless communication, implemented using a configurable phase shifter network.

In certain aspects, the configurable phase shifter network generally includes a first switch coupled to a common terminal of the phase shifter network, a first phase shifter coupled between a first terminal of the phase shifter network and the first switch, a second switch coupled in parallel with the first phase shifter, a third switch coupled to the common terminal, a fourth switch coupled to the first terminal, and a second phase shifter coupled between the fourth switch and the third switch.

In certain aspects, an apparatus for wireless communication generally includes at least one amplifier, a filter circuit coupled to the at least one amplifier, a first switch coupled to an antenna, a first phase shifter coupled between the filter circuit and the first switch, a second switch coupled in parallel with the first phase shifter, a third switch coupled to the antenna, a fourth switch coupled to the filter circuit, and a second phase shifter coupled between the fourth switch and the third switch.

Certain aspects are directed to a method for wireless communication. The method generally includes selecting between at least one first phase shifter or at least one second phase shifter selectively coupled to the at least one first phase shifter, incorporating the at least one first phase shifter or the at least one second phase shifter in one or more signal paths between an antenna and a transceiver based on the selection, and routing a signal between the antenna and the transceiver via the one or more signal paths for transmission or reception.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects.

Figure 1:
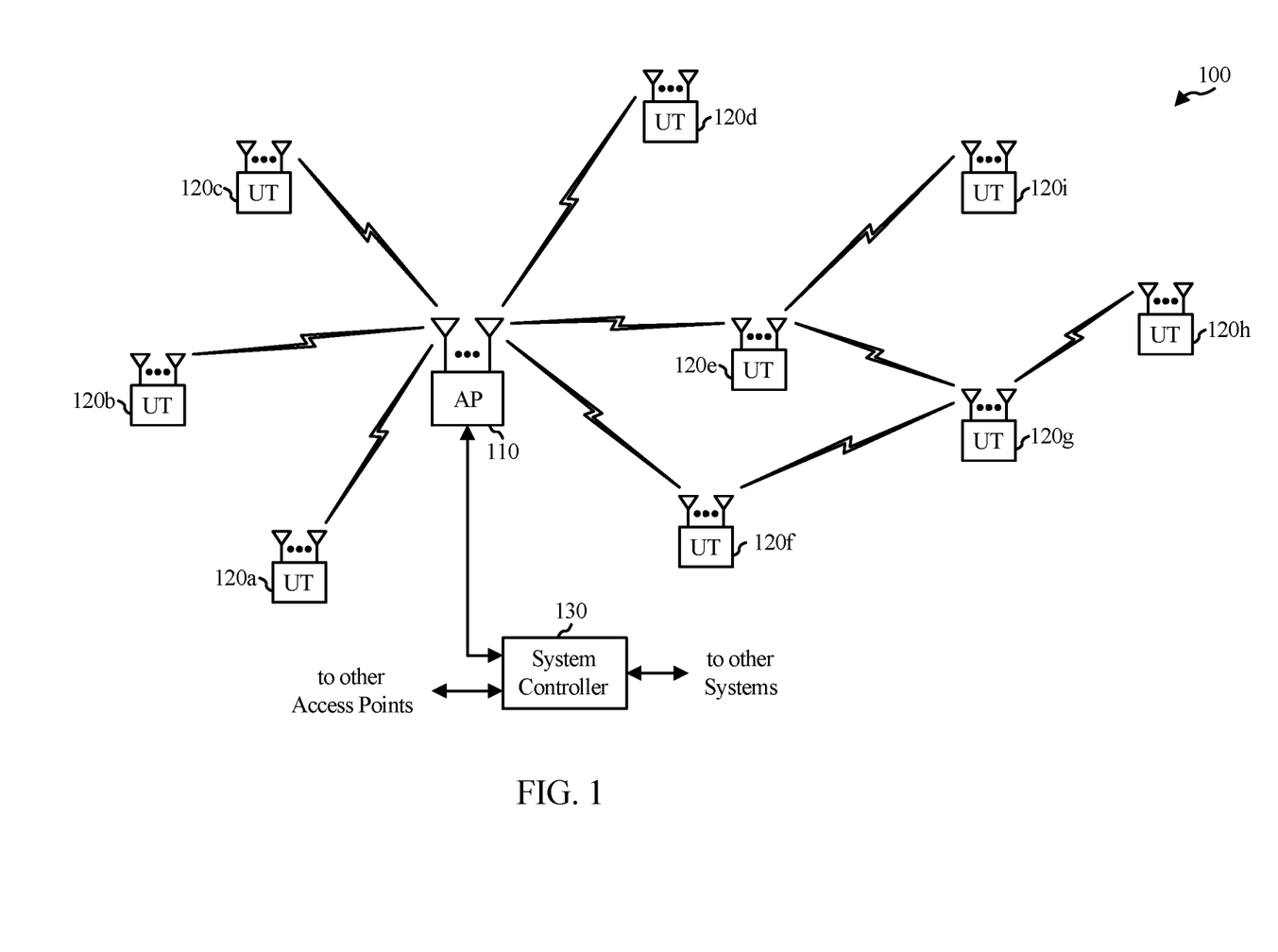
FIG. 1 is a diagram of an example wireless communications network, in accordance with certain aspects of the present disclosure.

As used herein, the term "connected with" in the various tenses of the verb "connect" may mean that element A is directly connected to element B or that other elements may be connected between elements A and B (i.e., that element A is indirectly connected with element B). In the case of electrical components, the term "connected with" may also be used herein to mean that a wire, trace, or other electrically conductive material is used to electrically connect elements A and B (and any components electrically connected therebetween). AN EXAMPLE WIRELESS SYSTEM FIG. 1 illustrates a wireless communications system 100 with access points 110 and user terminals 120, in which aspects of the present disclosure may be practiced. For simplicity, only one access point 110 is shown in FIG. 1. An access point (AP) is generally a fixed station that communicates with the user terminals and may also be referred to as a base station (BS), an evolved Node B (eNB), or some other terminology. A user terminal (UT) may be fixed or mobile and may also be referred to as a mobile station (MS), an access terminal, user equipment (UE), a station (STA), a client, a wireless device, or some other terminology. A user terminal may be a wireless device, such as a cellular phone, a personal digital assistant (PDA), a handheld device, a wireless modem, a laptop computer, a tablet, a personal computer, etc.

Access point 110 may communicate with one or more user terminals 120 at any given moment on the downlink and uplink. The downlink (i.e., forward link) is the communication link from the access point to the user terminals, and the uplink (i.e., reverse link) is the communication link from the user terminals to the access point. A user terminal may also communicate peer-to-peer with another user terminal. A system controller 130 couples to and provides coordination and control for the access points.

System 100 employs multiple transmit and multiple receive antennas for data transmission on the downlink and uplink. Access point 110 may be equipped with a number $N_{ap}$ of antennas to achieve transmit diversity for downlink transmissions and/or receive diversity for uplink transmissions. A set $N_u$ of selected user terminals 120 may receive downlink transmissions and transmit uplink transmissions. Each selected user terminal transmits user-specific data to and/or receives user-specific data from the access point. In general, each selected user terminal may be equipped with one or multiple antennas (i.e., $N_{ut} \geq 1$). The $N_u$ selected user terminals can have the same or different number of antennas.

Wireless system 100 may be a time division duplex (TDD) system or a frequency division duplex (FDD) system. For a TDD system, the downlink and uplink share the same frequency band. For an FDD system, the downlink and uplink use different frequency bands. System 100 may also utilize a single carrier or multiple carriers for transmission. Each user terminal 120 may be equipped with a single antenna (e.g., to keep costs down) or multiple antennas (e.g., where the additional cost can be supported). In certain aspects of the present disclosure, the access point 110 and/or user terminal 120 may include a configurable phase shifter, as described in more detail herein.

Figure 2:
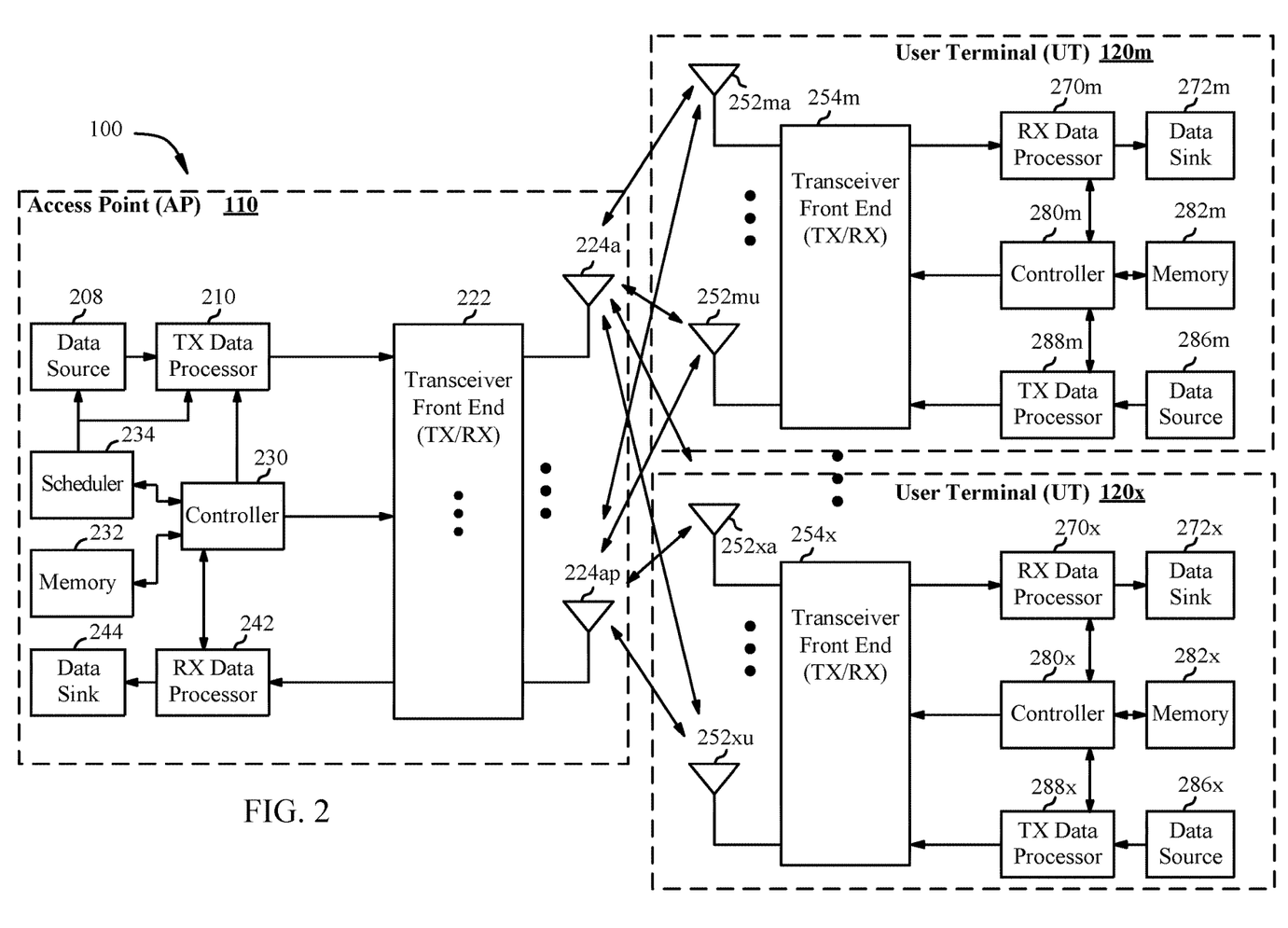
FIG. 2 is a block diagram of an example access point (AP) and example user terminals, in accordance with certain aspects of the present disclosure.

FIG. 2 shows a block diagram of access point 110 and two user terminals 120m and 120x in wireless system 100. Access point 110 is equipped with $N_{ap}$ antennas 224a through 224ap. User terminal 120m is equipped with $N_{ut,m}$ antennas 252ma through 252mu, and user terminal 120x is equipped with $N_{ut,x}$ antennas 252xa through 252xu. Access point 110 is a transmitting entity for the downlink and a receiving entity for the uplink. Each user terminal 120 is a transmitting entity for the uplink and a receiving entity for the downlink. As used herein, a "transmitting entity" is an independently operated apparatus or device capable of transmitting data via a frequency channel, and a "receiving entity" is an independently operated apparatus or device capable of receiving data via a frequency channel. In the following description, the subscript "dn" denotes the downlink, the subscript "up" denotes the uplink, $N_{up}$ user terminals are selected for simultaneous transmission on the uplink, $N_{dn}$ user terminals are selected for simultaneous transmission on the downlink. $N_{up}$ may or may not be equal to $N_{dn}$, and $N_{up}$ and $N_{dn}$ may be static values or can change for each scheduling interval. Beam-steering or some other spatial processing technique may be used at the access point and user terminal.

On the uplink, at each user terminal 120 selected for uplink transmission, a TX data processor 288 receives traffic data from a data source 286 and control data from a controller 280. TX data processor 288 processes (e.g., encodes, interleaves, and modulates) the traffic data $\{d_{up}\}$ for the user terminal based on the coding and modulation schemes associated with the rate selected for the user terminal and provides a data symbol stream $\{s_{up}\}$ for one of the $N_{ut,m}$ antennas. A transceiver front end (TX/RX) 254 (also known as a radio frequency front end (RFFE)) receives and processes (e.g., converts to analog, amplifies, filters, and frequency upconverts) a respective symbol stream to generate an uplink signal. The transceiver front end 254 may also route the uplink signal to one of the $N_{ut,m}$ antennas for transmit diversity via a radio-frequency (RF) switch, for example. The controller 280 may control the routing within the transceiver front end 254. Memory 282 may store data and program codes for the user terminal 120 and may interface with the controller 280.

A number $N_{up}$ of user terminals 120 may be scheduled for simultaneous transmission on the uplink. Each of these user terminals transmits its set of processed symbol streams on the uplink to the access point.

At access point 110, $N_{ap}$ antennas 224a through 224ap receive the uplink signals from all $N_{up}$ user terminals transmitting on the uplink. For receive diversity, a transceiver front end 222 may select signals received from one of the antennas 224 for processing. The signals received from multiple antennas 224 may be combined for enhanced receive diversity. The access point's transceiver front end 222 also performs processing complementary to that performed by the user terminal's transceiver front end 254 and provides a recovered uplink data symbol stream. The recovered uplink data symbol stream is an estimate of a data symbol stream $\{s_{up}\}$ transmitted by a user terminal. An RX data processor 242 processes (e.g., demodulates, deinterleaves, and decodes) the recovered uplink data symbol stream in accordance with the rate used for that stream to obtain decoded data. The decoded data for each user terminal may be provided to a data sink 244 for storage and/or a controller 230 for further processing. In certain aspects, the transceiver front end (TX/RX) 222 of access point 110 and/or transceiver front end 254 of user terminal 120 may include a configurable phase shifter, as described in more detail herein.

On the downlink, at access point 110, a TX data processor 210 receives traffic data from a data source 208 for $N_{dn}$ user terminals scheduled for downlink transmission, control data from a controller 230 and possibly other data from a scheduler 234. The various types of data may be sent on different transport channels. TX data processor 210 processes (e.g., encodes, interleaves, and modulates) the traffic data for each user terminal based on the rate selected for that user terminal. TX data processor 210 may provide a downlink data symbol streams for one of more of the $N_{dn}$ user terminals to be transmitted from one of the $N_{ap}$ antennas. The transceiver front end 222 receives and processes (e.g., converts to analog, amplifies, filters, and frequency upconverts) the symbol stream to generate a downlink signal. The transceiver front end 222 may also route the downlink signal to one or more of the $N_{ap}$ antennas 224 for transmit diversity via an RF switch, for example. The controller 230 may control the routing within the transceiver front end 222. Memory 232 may store data and program codes for the access point 110 and may interface with the controller 230.

At each user terminal 120, $N_{ut,m}$ antennas 252 receive the downlink signals from access point 110. For receive diversity at the user terminal 120, the transceiver front end 254 may select signals received from one of the antennas 252 for processing. The signals received from multiple antennas 252 may be combined for enhanced receive diversity. The user terminal's transceiver front end 254 also performs processing complementary to that performed by the access point's transceiver front end 222 and provides a recovered downlink data symbol stream. An RX data processor 270 processes (e.g., demodulates, deinterleaves, and decodes) the recovered downlink data symbol stream to obtain decoded data for the user terminal.

Figure 3:
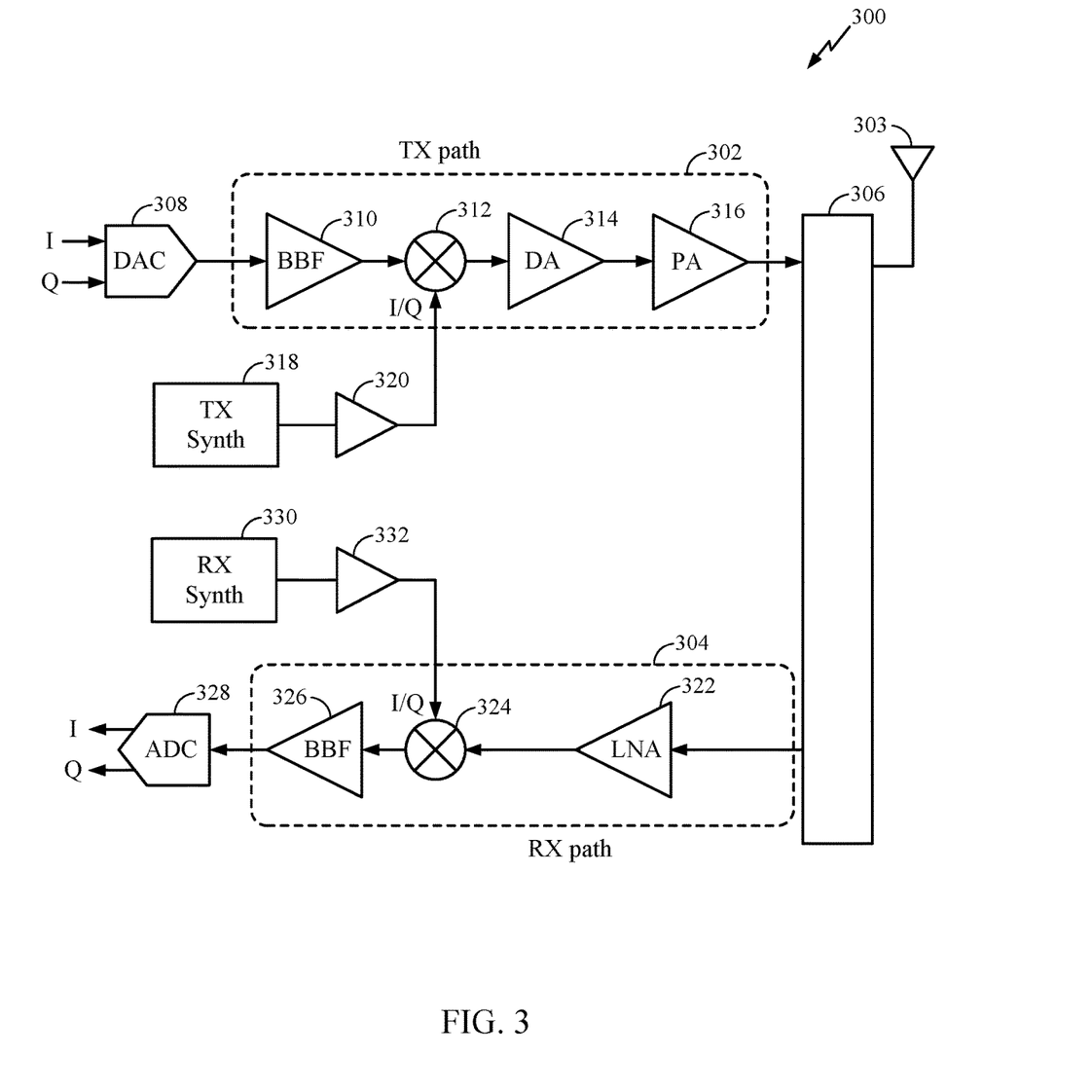
FIG. 3 is a block diagram of an example transceiver front end, in accordance with certain aspects of the present disclosure.

FIG. 3 is a block diagram of an example transceiver front end 300, such as transceiver front ends 222, 254 in FIG. 2, in which aspects of the present disclosure may be practiced. The transceiver front end 300 includes a transmit (TX) path 302 (also known as a transmit chain) for transmitting signals via one or more antennas and a receive (RX) path 304 (also known as a receive chain) for receiving signals via the antennas. When the TX path 302 and the RX path 304 share an antenna 303, the paths may be connected with the antenna via an interface 306, which may include any of various suitable RF devices, such as a filter circuits (e.g., duplexer), switches, and configurable phase shifters, as described in more detail herein.

Receiving in-phase (I) or quadrature (Q) baseband analog signals from a digital-to-analog converter (DAC) 308, the TX path 302 may include a baseband filter (BBF) 310, a mixer 312, a driver amplifier (DA) 314, and a power amplifier (PA) 316. The BBF 310, the mixer 312, and the DA 314 may be included in a radio frequency integrated circuit (RFIC), while the PA 316 may be external to the RFIC. The BBF 310 filters the baseband signals received from the DAC 308, and the mixer 312 mixes the filtered baseband signals with a transmit local oscillator (LO) signal to convert the baseband signal of interest to a different frequency (e.g., upconvert from baseband to RF). This frequency conversion process produces the sum and difference frequencies of the LO frequency and the frequency of the signal of interest. The sum and difference frequencies are referred to as the beat frequencies. The beat frequencies are typically in the RF range, such that the signals output by the mixer 312 are typically RF signals, which may be amplified by the DA 314 and/or by the PA 316 before transmission by the antenna 303.

The RX path 304 includes a low noise amplifier (LNA) 322, a mixer 324, and a baseband filter (BBF) 326. The LNA 322, the mixer 324, and the BBF 326 may be included in a radio frequency integrated circuit (RFIC), which may or may not be the same RFIC that includes the TX path components. RF signals received via the antenna 303 may be amplified by the LNA 322, and the mixer 324 mixes the amplified RF signals with a receive local oscillator (LO) signal to convert the RF signal of interest to a different baseband frequency (i.e., downconvert). The baseband signals output by the mixer 324 may be filtered by the BBF 326 before being converted by an analog-to-digital converter (ADC) 328 to digital I or Q signals for digital signal processing.

While it is desirable for the output of an LO to remain stable in frequency, tuning the LO to different frequencies typically entails using a variable-frequency oscillator, which involves compromises between stability and tunability. Contemporary systems may employ frequency synthesizers with a voltage-controlled oscillator (VCO) to generate a stable, tunable LO with a particular tuning range. Thus, the transmit LO frequency may be produced by a TX frequency synthesizer 318, which may be buffered or amplified by amplifier 320 before being mixed with the baseband signals in the mixer 312. Similarly, the receive LO frequency may be produced by an RX frequency synthesizer 330, which may be buffered or amplified by amplifier 332 before being mixed with the RF signals in the mixer 324. In certain aspects, the TX frequency synthesizer 318 may include a VCO, as described in more detail herein.

Example Reconfigurable Architecture for Phase Shifting

To implement carrier aggregation (CA), multiple bands may be designed to transmit and receive simultaneously. Therefore, multiple RF filters may be connected to the same antenna. A multiplexer may be connected between the antenna and the RF filters. The insertion losses of unused RF filters may load one or more other RF filters that may be in use, increasing current consumption and insertion loss. Thus, a switchable multiplexer may be used to disconnect the unused filters. Certain aspects of the present disclosure are directed to a configurable phase shifter that improves phase matching of bands, while also reducing insertion loss and current consumption and improving adjacent channel leakage ratio (ACLR) and receiver sensitivity due to better matching, as compared to conventional phase shifter implementations.

Figure 4:
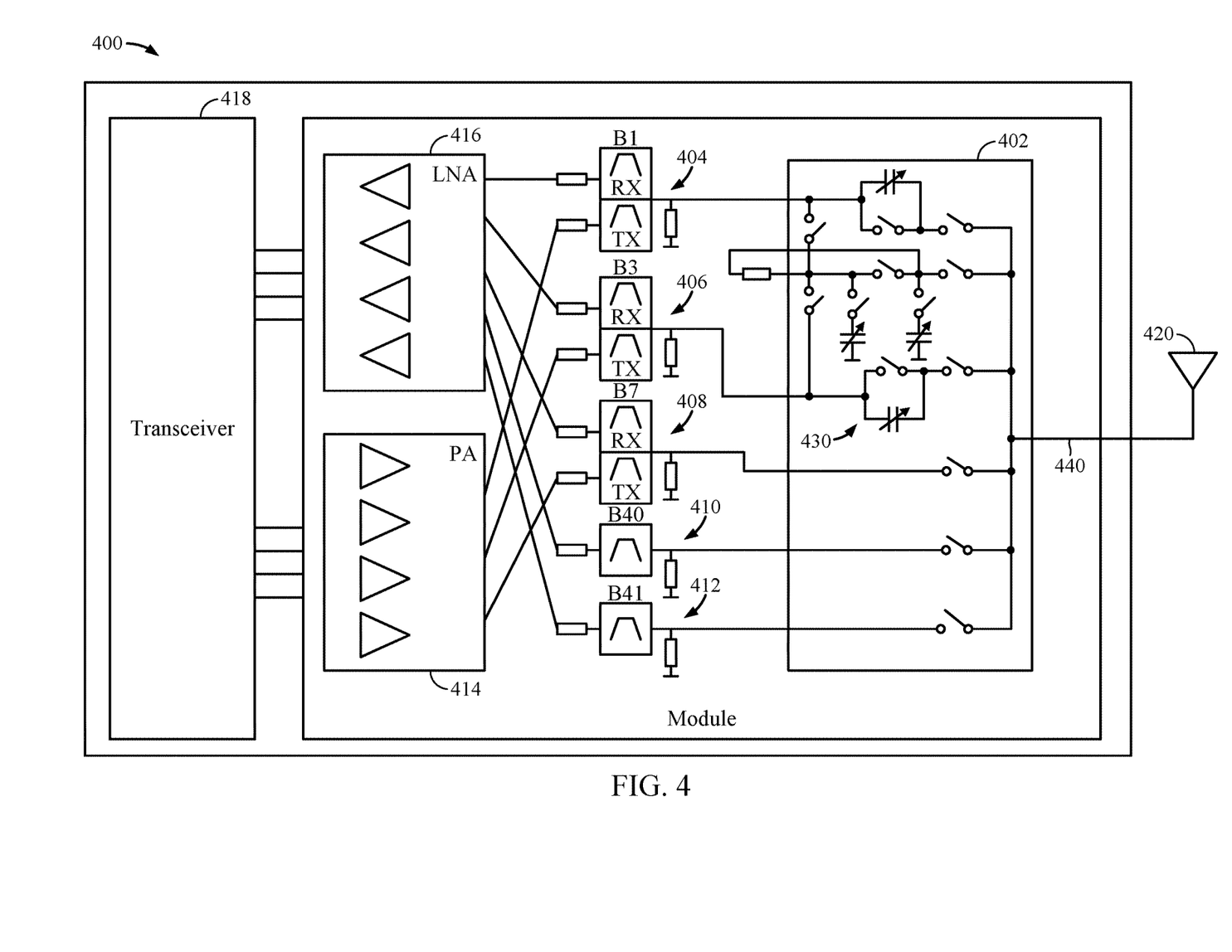
FIG. 4 is a block diagram of an example transceiver front end having a reconfigurable architecture for phase shifting, in accordance with certain aspects of the present disclosure.

FIG. 4 is a block diagram of an example transceiver front end 400 having a reconfigurable architecture for phase shifting, in accordance with certain aspects of the present disclosure. As illustrated, the transceiver front end 400 includes an antenna switch 402 that selectively couples the antenna 420 at the antenna node 440 to duplexers 404, 406, 408 for bands B1, B3, and B7 and receive filters 410, 412 for bands B40, B41, respectively. The antenna node 440 may also be referred to herein as a common terminal. These frequency bands (e.g., B1, B3, B7, B40, and B41) are included for illustrative purposes, but it is to be understood that other combinations of frequency bands may be used in this or other transceiver front ends. Each of the duplexers 404, 406, 408 has a receive filter and a transmit filter. The transmit filters receive amplified signals from PAs 414 (e.g., corresponding to PA 316) coupled to a transceiver 418, and the receive filters provide signals to low-noise amplifiers (LNAs) 416 (e.g., corresponding to LNA 322) coupled to the transceiver 418. In certain aspects, the antenna switch 402 may include one or more reconfigurable phase shifters (e.g., a reconfigurable phase shifter 430). The reconfigurable phase shifter 430 may be configured based on a mode of operation of the transceiver front end 400 to improve transceiver performance, as described in more detail with respect to FIGS. 5A-5F.

FIGS. 5A-F illustrate an example implementation of the reconfigurable phase shifter 430 in different configurations, in accordance with certain aspects of the present disclosure. The antenna switch 402 includes switches 502, 504, 506 which may be used to selectively couple the antenna node 440 to duplexers for two of the frequency bands (e.g., duplexers 404, 406 for bands B1, B3, respectively) through high-pass (HP) phase shifters 510, 514 or a low-pass (LP) phase shifter 512. The LP and HP phase shifters 510, 512, 514 may be selectively incorporated in a path between the antenna node 440 and the duplexers. The HP phase shifter 510 may include switch 528 coupled in parallel with capacitive element 536 to provide a through path. Similarly, the HP phase shifter 514 may include switch 522 coupled in parallel with capacitive element 520. The LP phase shifter 512 may be implemented by a π-network, as illustrated, and may include inductive element 538, capacitive elements 526, 530, and switches 524, 540, 542. The switch 524 implements a common through path when LP phase shifting is disabled. In certain aspects, one or more of the capacitive elements 520, 526, 530, 536 may be tunable. In certain aspects, the antenna switch 402 may be an integrated circuit (IC), and as illustrated, the inductive element 538 may be implemented outside the IC to reduce IC size and improve performance. For other aspects, the inductive element 538 may be implemented in the IC.

Figure 5A:
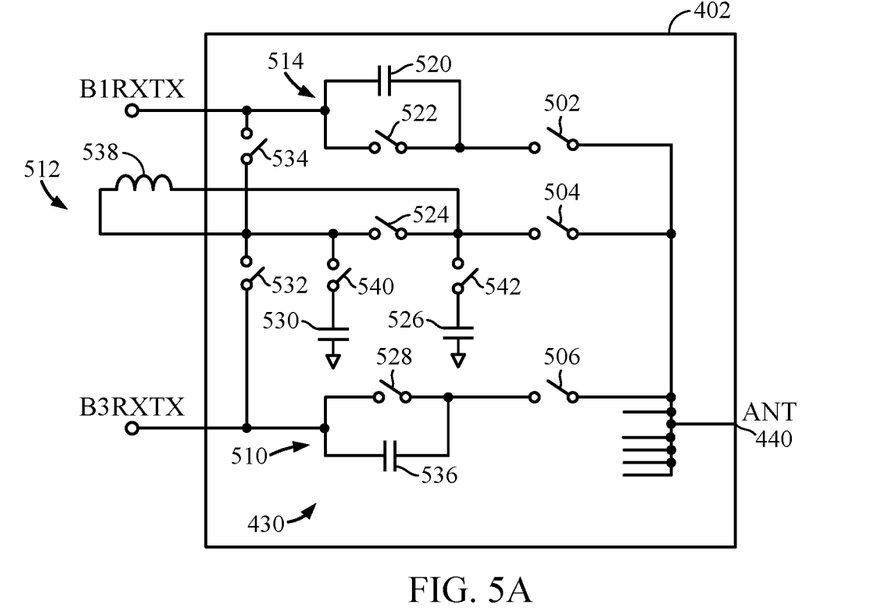
FIGS. 5A-F illustrate a reconfigurable phase shifter in different configurations, in accordance with certain aspects of the present disclosure.

FIG. 5A illustrates the phase shifter 430 in an open mode of operation, in accordance with certain aspects of the present disclosure. For example, the switches 502, 504, 506 may be open, decoupling the duplexers 404, 406 for bands B1, B3 from the antenna node 440.

Figure 5B:
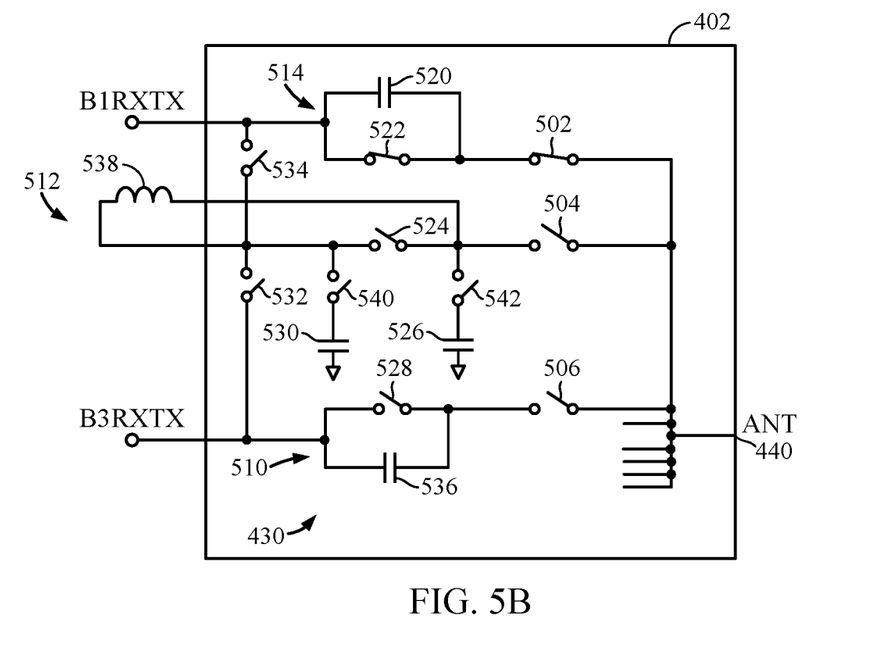

FIG. 5B illustrates the phase shifter 430 configured in a single mode of operation, in accordance with certain aspects of the present disclosure. In this case, the switch 522 coupled in parallel with the capacitive element 520 of the HP phase shifter 514 is closed, bypassing the capacitive element 520. Moreover, the switch 502 is closed such that only the duplexer 404 for band B1 is directly coupled to the antenna node 440, as illustrated. Thus, the phase shifter 430 is configured in a single mode of operation for band B1 without phase shifting.

Figure 5C:
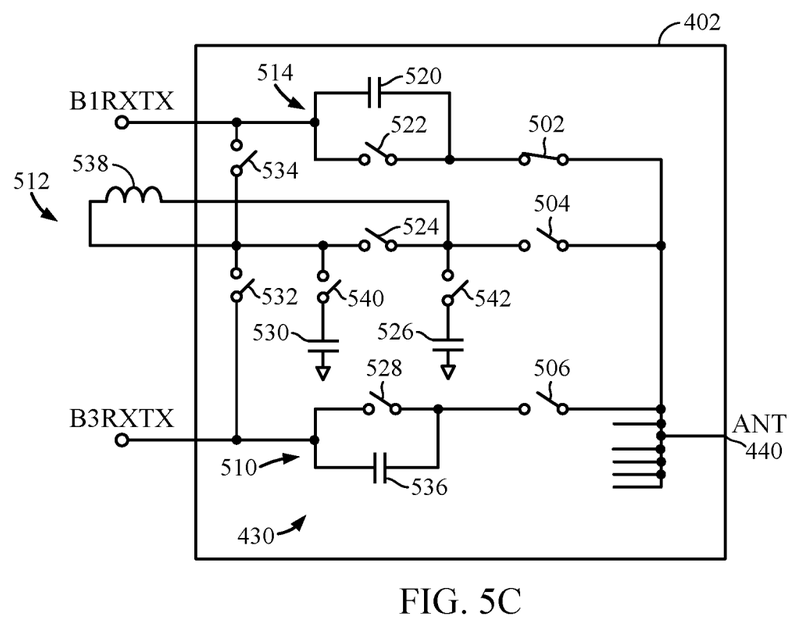

FIG. 5C illustrates the phase shifter 430 configured in a single mode with HP phase shifting, in accordance with certain aspects of the present disclosure. In this case, the switch 522 coupled in parallel with the capacitive element 520 of the HP phase shifter 514 is open. The switch 502 is closed such that only the duplexer 404 for band B1 is coupled to the antenna node 440 through a HP phase shifter implemented using capacitive element 520.

Figure 5D:
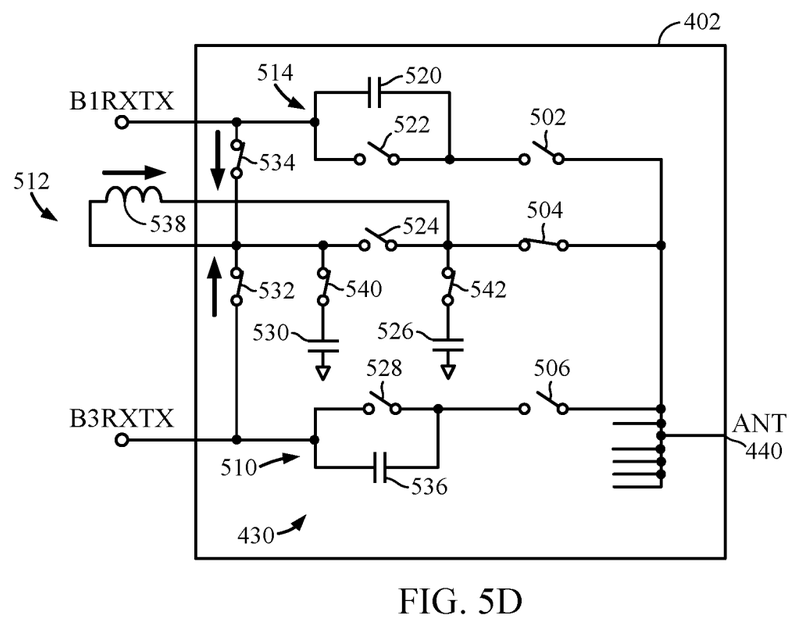

FIG. 5D illustrates the phase shifter 430 configured in a quadplex mode with LP phase shifting, in accordance with certain aspects of the present disclosure. In this case, the switches 504, 532, 534, 540, 542 are closed, coupling the antenna node 440 to both duplexers 404, 406 for bands B1, B3. The other switches 502, 506, 522, 524, and 528 are open. For example, a transmission signal may flow from the duplexers 404, 406 for bands B1, B3 through switches 532, 534, through the inductive element 538, and through the switch 504 to the antenna node 440. The switches 540, 542 are also closed to couple the capacitive elements 526, 530 to the inductive element 538, as illustrated, to implement the π-network for LP phase shifting of the transmission signal.

Figure 5E:
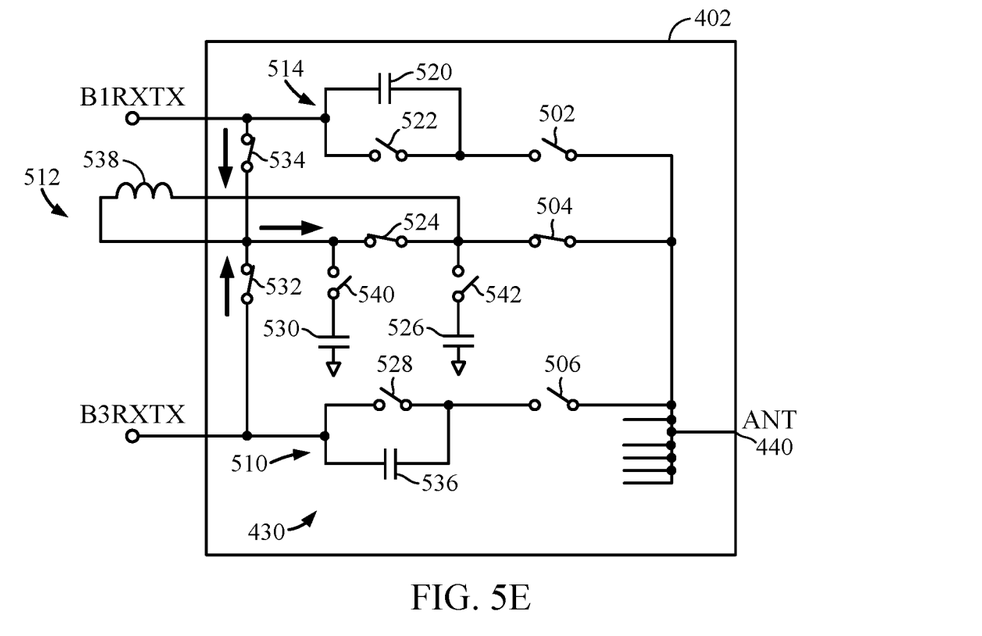

FIG. 5E illustrates the phase shifter 430 configured in a quadplex mode without phase shifting, in accordance with certain aspects of the present disclosure. In this case, the switches 532, 534, 524, and 504 are closed, while the other switches 502, 506, 522, 528, 540, 542 are open. Closing switch 524 bypasses the inductive element 538, as illustrated. Moreover, the switches 540, 542 are open, decoupling the capacitive elements 526, 530 from the antenna node 440. Thus, the duplexers 404, 406 for bands B1, B3 are both directly coupled to the antenna node 440. For example, a transmission signal flows through switches 532, 534, 524, 504 directly to the antenna node 440 without phase shifting, as illustrated.

Figure 5F:
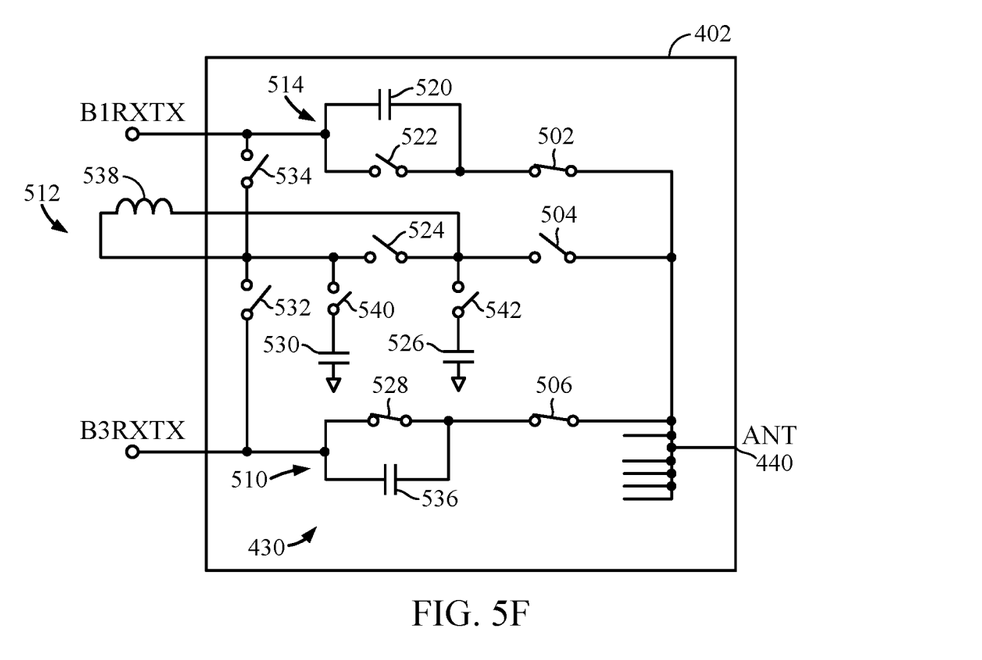

FIG. 5F illustrates the phase shifter 430 configured in a quadplex mode with HP phase shifting, in accordance with certain aspects of the present disclosure. In this case, switches 502, 506, and 528 are closed, while the other switches 504, 522, 524, 532, 534, 540, and 542 are open. Thus, the duplexers 404, 406 for bands B1, B3 are coupled to the antenna node 440. The capacitive element 536 is bypassed by closing switch 528. HP phase shifting is implemented via capacitive element 520 between the antenna node 440 and the duplexer 404 for band B1, as illustrated.

While FIGS. 5A-5F represent one example of a phase shifter network to facilitate understanding, aspects of the present disclosure may be implemented using any types of phase shifters that are reconfigurable using switches. For example, LP, HP, band-pass (BP), or band-stop (BS) phase shifter may be used, as described in more detail with respect to FIG. 6.

Figure 6:
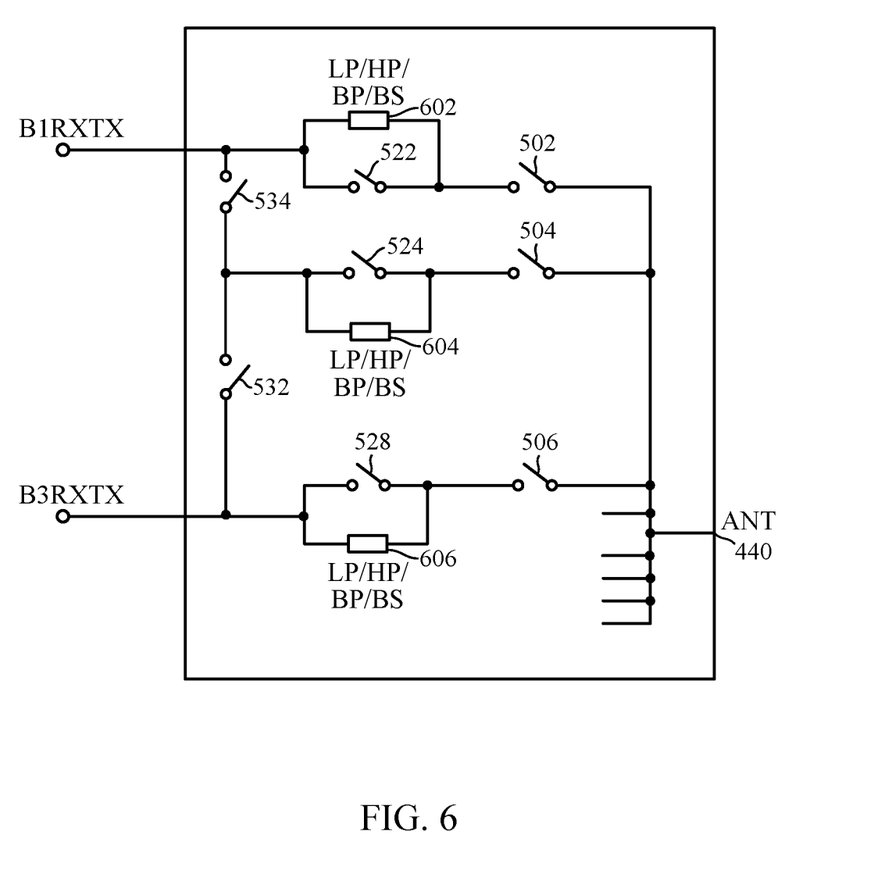
FIG. 6 illustrates a reconfigurable phase shifter, in accordance with certain aspects of the present disclosure.

FIG. 6 illustrates an example phase shifter 600, in accordance with certain aspects of the present disclosure. As illustrated, the antenna node 440 may be selectively coupled to phase shifters 602, 604, 606 via switch 502, 504, 506. Each of the phase shifters 602, 604, 606 may be implemented as either a LP, HP, BP, or BS phase shifter. For example, when phase shifters 602, 606 are implemented as HP phase shifters, the phase shifters 602, 606 may correspond to the capacitive elements 520, 536, respectively. The phase shifters 602, 604, 606 may be bypassed via switches 522, 524, 528, as described herein. Moreover, switches 532, 534 may be used to couple the duplexers for bands B1 and B3 to the phase shifter 604, as described herein.

While the present disclosure has described a few example implementations of configurable phase shifter networks to facilitate understanding, any suitable configuration of a phase shifter network may be used having multiple switches to form a network with phase shifters that are reconfigurable via the switches. Moreover, while the example phase shifter network described herein is coupled between transceivers for bands B1, B3, the phase shifter network may be used to form a phase shifter network for any suitable transceiver, receiver, or transmitter bands.

Figure 7:
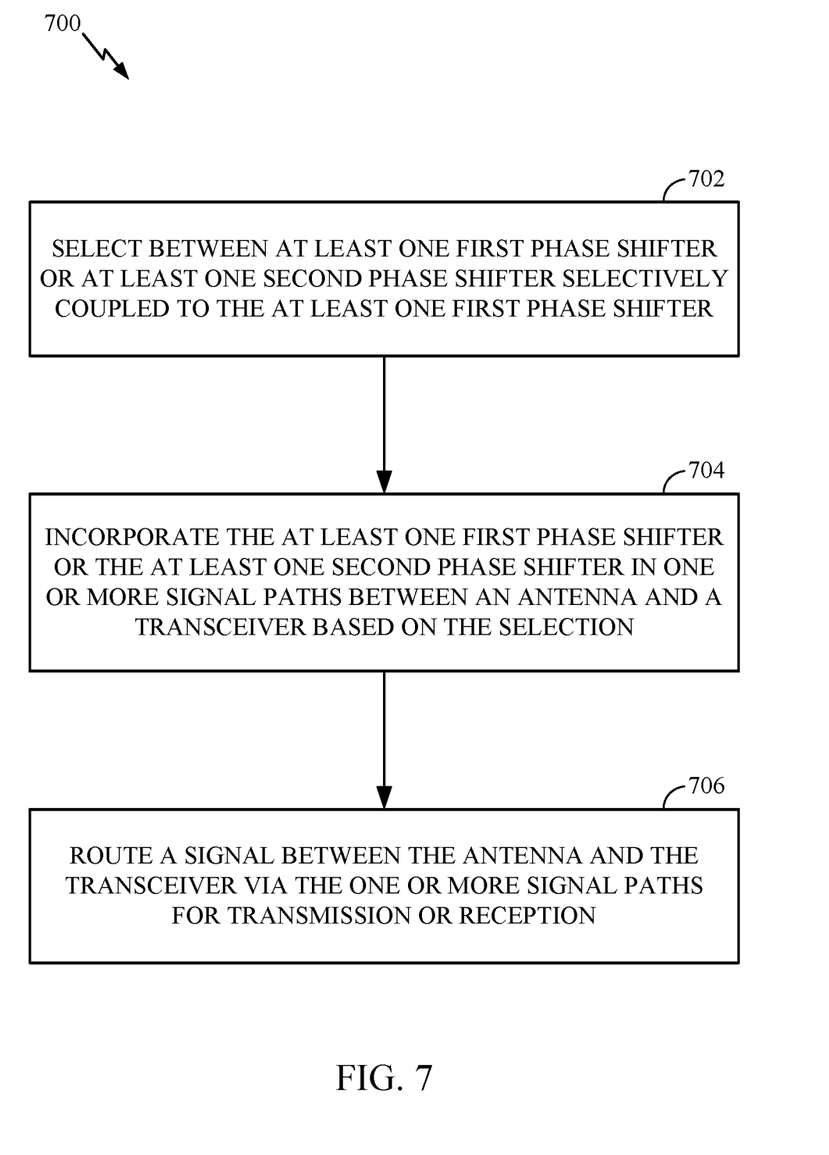
FIG. 7 is a flow diagram of example operations for wireless communication, in accordance with certain aspects of the present disclosure.

FIG. 7 is a flow diagram of example operations 700 for wireless communication, in accordance with certain aspects of the present disclosure. The operations 700 may be performed by a circuit, such as the transceiver front end 400, with a configurable phase shifter (e.g., reconfigurable phase shifter 430).

The operations 700 begin, at block 702, by selecting between at least one first phase shifter (e.g., at least one LP phase shifter) or at least one second phase shifter (e.g., at least one HP phase shifter) selectively coupled to the at least one first phase shifter, and at block 704, incorporating (e.g., via switches as described herein) the at least one first phase shifter or the at least one second phase shifter in one or more signal paths between an antenna (e.g., antenna 420) and a transceiver (e.g., transceiver 418) based on the selection. For example, the selecting may include selecting the at least one second phase shifter. The at least one second phase shifter may include a first HP phase shifter (e.g., HP phase shifter 514) and a second HP phase shifter (e.g., HP phase shifter 510). In this case, the incorporating of the at least one second phase shifter in the one or more signal paths may include incorporating the first HP phase shifter in a first signal path (e.g., signal path between duplexer 404 and antenna 420) and the second HP phase shifter in a second signal path (e.g., signal path between duplexer 406 and antenna 420). In certain aspects, the selecting may include selecting the at least one first phase shifter, the at least one first phase shifter comprising at least one LP phase shifter. In this case, the at least one LP phase shifter is incorporated in the one or more signal paths. At block 706, the circuit routes a signal between the antenna and the transceiver via the one or more signal paths for transmission or reception of the signal.

The various operations of methods described above may be performed by any suitable means capable of performing the corresponding functions. The means may include various hardware component(s) and/or module(s), including, but not limited to one or more circuits. Generally, where there are operations illustrated in figures, those operations may have corresponding counterpart means-plus-function components with similar numbering.

As used herein, the term "determining" encompasses a wide variety of actions. For example, "determining" may include calculating, computing, processing, deriving, investigating, looking up (e.g., looking up in a table, a database, or another data structure), ascertaining, and the like. Also, "determining" may include receiving (e.g., receiving information), accessing (e.g., accessing data in a memory), and the like. Also, "determining" may include resolving, selecting, choosing, establishing, and the like.

As used herein, a phrase referring to "at least one of" a list of items refers to any combination of those items, including single members. As an example, "at least one of: a, b, or c" is intended to cover: a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

The various illustrative logical blocks, modules, and circuits described in connection with the present disclosure may be implemented or performed with discrete hardware components designed to perform the functions described herein.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A configurable phase shifter network for wireless communication, comprising:
    a first switch coupled to a common terminal of the configurable phase shifter network;
    a first phase shifter coupled between a first terminal of the configurable phase shifter network and the first switch;
    a second switch coupled in parallel with the first phase shifter;
    a third switch coupled to the common terminal;
    a fourth switch coupled to the first terminal; and
    a second phase shifter coupled between the fourth switch and the third switch, wherein at least one of the first phase shifter or the second phase shifter is configured to route a signal between the common terminal and a transceiver via one or more signal paths for transmission or reception.

2. The configurable phase shifter network for wireless communication of claim 1, wherein the first phase shifter comprises a high-pass (HP) phase shifter, and wherein the second phase shifter comprises a low-pass (LP) phase shifter.

3. The configurable phase shifter network for wireless communication of claim 1, wherein the second phase shifter comprises:
    a fifth switch coupled to the third switch;
    an inductive element coupled in parallel with the fifth switch;
    a first capacitive element selectively coupled to a first terminal of the inductive element; and
    a second capacitive element selectively coupled to a second terminal of the inductive element.

4. The configurable phase shifter network for wireless communication of claim 3, further comprising:
    a sixth switch coupled between the first capacitive element and the first terminal of the inductive element; and
    a seventh switch coupled between the second capacitive element and the second terminal of the inductive element.

5. An apparatus for wireless communication, the apparatus comprising an integrated circuit (IC) including at least a portion of the configurable phase shifter network of claim 3, wherein:
    the first switch, the second switch, the third switch, the fourth switch, the fifth switch, the first phase shifter, the first capacitive element, and the second capacitive element are integrated in the IC; and
    the inductive element is implemented outside the IC.

6. The configurable phase shifter network for wireless communication of claim 1, further comprising:
    a fifth switch coupled to the common terminal of the configurable phase shifter network; and
    a third phase shifter coupled between a second terminal of the configurable phase shifter network and the fifth switch.

7. The configurable phase shifter network for wireless communication of claim 6, further comprising:
    a sixth switch coupled between the second terminal of the configurable phase shifter network and the second phase shifter.

8. An apparatus for wireless communication, comprising the configurable phase shifter network of claim 6, the apparatus further comprising a first filter circuit coupled to the first terminal of the configurable phase shifter network.

9. The apparatus of claim 8, wherein the first filter circuit comprises a duplexer.

10. The apparatus of claim 9, further comprising a second duplexer coupled to the second terminal of the configurable phase shifter network.

11. The configurable phase shifter network for wireless communication of claim 1, wherein at least one of the first phase shifter or the second phase shifter comprises a tunable capacitive element.

12. An apparatus for wireless communication, comprising:
    at least one amplifier;
    a first filter circuit coupled to the at least one amplifier;
    a first switch coupled to an antenna;
    a first phase shifter coupled between the first filter circuit and the first switch;
    a second switch coupled in parallel with the first phase shifter;
    a third switch coupled to the antenna;
    a fourth switch coupled to the first filter circuit; and
    a second phase shifter coupled between the fourth switch and the third switch, wherein at least one of the first phase shifter or the second phase shifter is configured to route a signal between the antenna and a transceiver via one or more signal paths for transmission or reception.

13. The apparatus of claim 12, wherein the at least one amplifier comprises a power amplifier (PA) and a low-noise amplifier (LNA), and wherein the first filter circuit comprises a duplexer coupled to the PA and the LNA.

14. The apparatus of claim 12, wherein the second phase shifter comprises:
- a fifth switch coupled to the third switch;
- an inductive element coupled in parallel with the fifth switch;
- a first capacitive element selectively coupled to a first terminal of the inductive element; and
- a second capacitive element selectively coupled to a second terminal of the inductive element.

15. The apparatus of claim 14, further comprising:
- a sixth switch coupled between the first capacitive element and the first terminal of the inductive element; and
- a seventh switch coupled between the second capacitive element and the second terminal of the inductive element.

16. The apparatus of claim 12, further comprising:
- a second filter circuit coupled to the at least one amplifier;
- a fifth switch coupled to the antenna; and
- a third phase shifter coupled between the second filter circuit and the fifth switch.

17. The apparatus of claim 16, further comprising a sixth switch coupled between the second filter circuit and the second phase shifter.

18. The apparatus of claim 16, wherein:
- the at least one amplifier comprises a power amplifier (PA) and a low-noise amplifier (LNA);
- the first filter circuit comprises a first duplexer selectively coupled to the PA and the LNA; and
- the second filter circuit comprises a second duplexer selectively coupled to the PA and the LNA.

* * * * *